(No Model.)
F. R. WOODWARD.
TREE PROTECTOR.
No. 356,389. Patented Jan. 18, 1887.
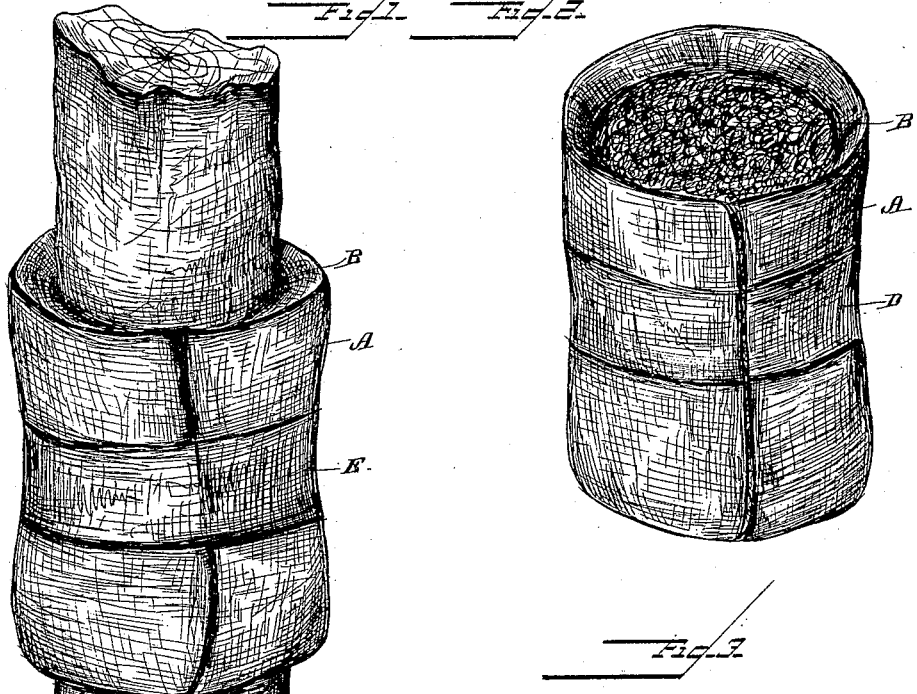
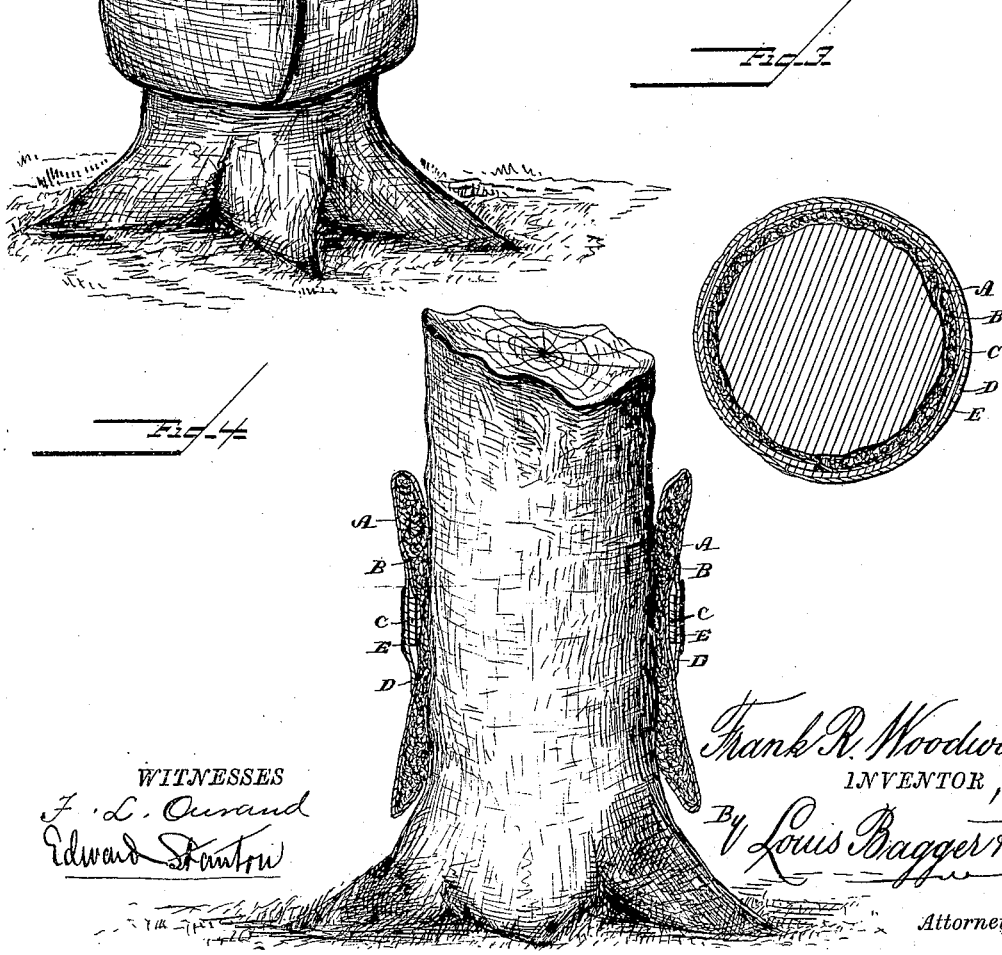
WITNESSES
F. L. Ourand
Edward Stanton
Frank R. Woodward
INVENTOR,
By Louis Bagger & Co.
Attorneys

UNITED STATES PATENT OFFICE.

FRANK R. WOODWARD, OF HILL, NEW HAMPSHIRE.

TREE-PROTECTOR.

SPECIFICATION forming part of Letters Patent No. 356,389, dated January 18, 1887.

Application filed July 6, 1886. Serial No. 207,199. (No model.)

*To all whom it may concern:*

Be it known that I, FRANK R. WOODWARD, a citizen of the United States, and a resident of Hill, in the county of Merrimac and State of New Hampshire, have invented certain new and useful Improvements in Tree-Protectors; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of a portion of a tree provided with my improved tree-protector. Fig. 2 is a similar view of the protector removed from the tree. Fig. 3 is a transverse sectional view of the protector in place; and Fig. 4 is a vertical sectional view of the same.

Similar letters of reference indicate corresponding parts in all the figures.

My invention has relation to that class of protectors for the purpose of preventing insects and their larvæ from crawling upward on the trunk of the tree into the branches and foliage, as well as for the purpose of protecting the bark of the tree from being chafed or cut by supporting-straps or similar supports for guiding the young tree to a straight growth, in which a soft yielding packing is placed around the trunk; and it consists in the improved construction and combination of parts of such a packing or bandage, as hereinafter more fully described and claimed.

In the accompanying drawings, the letter A indicates a strip of textile material, the edges of which are bent inward and are secured to a filling or packing, B, of cotton or similar material, the ends of the strip and its filling being free and overlapping each other.

A flat spring, C, is placed around the filled strip, and is covered by a narrow strip, D, which, however, may be dispensed with, the entire bandage forming a cylinder open at one side and having overlapping free edges at that side, the spring being curved to force the ends of the filled strip together. This bandage is sprung around the trunk of the tree, and the spring will keep it in place, at the same time allowing the tree to grow and expand, the bandage expanding with the tree without chafing the bark or otherwise injuring the same, the soft filling preventing any injury.

After the bandage has been placed around the tree a line, E, of printer's ink, tar, or any sticky substance, is drawn around the bandage, and this line will prevent any insects from crawling up over the bandage, while at the same time it will be made upon the bandage, and not upon the bark of the tree, so that it will in no manner mar the tree.

Various kinds of materials may be used in the textile strip and in the filling, and the spring may either be steel, rubber, or any other suitable material.

Having thus described my invention, I claim and desire to secure by Letters Patent of the United States—

In a tree-protector, the combination of a strip of pliable material having its edges folded inward, a filling of cotton or other soft yielding material upon the inner side of said strip and folded edges, a curved spring secured thereto, and means for securing the same at its intermediate portion around a tree.

In testimony that I claim the foregoing as my own I have hereunto affixed my signature in presence of two witnesses.

FRANK R. WOODWARD.

Witnesses:
J. H. ALBIN,
J. H. MORRIS.